United States Patent [19]

Hornbaker

[11] 4,456,733

[45] Jun. 26, 1984

[54] THERMOPLASTIC POLYBLEND COMPOSITIONS

[75] Inventor: Edwin D. Hornbaker, Baton Rouge, La.

[73] Assignee: Ethyl Corporation, Richmond, Va.

[21] Appl. No.: 365,702

[22] Filed: Apr. 5, 1982

[51] Int. Cl.$^3$ .................. C08L 51/04; C08L 55/02; C08L 27/06

[52] U.S. Cl. ................................ 525/71; 525/78; 525/221; 525/301

[58] Field of Search .................... 525/78, 221, 71

[56] References Cited

U.S. PATENT DOCUMENTS

| | | | |
|---|---|---|---|
| 2,927,095 | 3/1960 | Witt | 525/301 |
| 3,626,033 | 12/1971 | Keskkula et al. | 525/74 |
| 3,644,577 | 2/1972 | Lee et al. | 525/78 |
| 4,311,806 | 1/1982 | Dufour | 525/71 |

FOREIGN PATENT DOCUMENTS

| | | | |
|---|---|---|---|
| 1469099 | 11/1968 | Fed. Rep. of Germany | 525/239 |
| 54-156051 | 12/1979 | Japan | 525/221 |

Primary Examiner—Carman J. Seccuro
Attorney, Agent, or Firm—Donald L. Johnson; John F. Sieberth

[57] ABSTRACT

Polyblends comprising a thermoplastic vinyl chloride polymer and a thermoplastic copolymer of (1) at least one vinyl aromatic monomer, (2) acrylic acid or methacrylic acid, or both, and (3) optionally at least one additional copolymerizable termonomer have useful properties, notably useful heat deflection temperatures under load. The copolymers are preferably rubber-modified graft copolymers.

11 Claims, No Drawings

THERMOPLASTIC POLYBLEND COMPOSITIONS

TECHNICAL FIELD

This invention relates to polyblends containing vinyl chloride polymers such as polyvinyl chloride.

BACKGROUND

Vinyl chloride resins are widely used in the manufacture of various useful end products, including moldings, tile, pipe, sheets, film, bottles, and the like. Unfortunately, unplasticized vinyl chloride resins used in the manufacture of rigid end products tend to have poor heat deformation characteristics. Consequently, they are unsuitable for use in certain areas of application where structural integrity under heat and load is of prime importance.

THE INVENTION

According to this invention, there is provided a thermoplastic polyblend composition comprising:
(A) a thermoplastic vinyl chloride polymer, preferably polyvinyl chloride, and
(B) a thermoplastic copolymer of
 (1) at least one vinyl aromatic monomer,
 (2) acrylic acid or methacrylic acid, or both, and
 (3) optionally at least one additional copolymerizable termonomer. While the proportions may be varied, it is preferred that the polyblend composition contain 90 to 30% by weight of component (A) and, correspondingly, 10 to 70% by weight of component (B).

Preferably, component (B) is a rubber-modified thermoplastic graft copolymer, although effective use may be made of the rubber-free copolymers.

In accordance with other embodiments of this invention, the foregoing polyblends further include an impact modifier.

The polyblends of this invention have useful properties, including good resistance to heat deformation under load and flame resistancy. They are readily produced by known blending procedures and require no special preparatory techniques or precautions.

These and other features, embodiments and advantages of the invention will become still further apparent from the ensuing description and appended claims.

Component (A) of the polyblends of this invention is a vinyl chloride polymer, viz., a homopolymer of vinyl chloride or a copolymer of vinyl chloride with a minor portion of one or more monomers copolymerizable therewith. In such copolymers the vinyl chloride comprises on a weight basis at least about 90% of the copolymer and the copolymerizable monomer comprises up to about 10%. A wide variety of copolymerizable monomers may be used to prepare such vinyl chloride copolymers. These include vinylidene chloride; vinyl acetate and vinyl stearate; acrylic and methacrylic acid esters; olefins such as ethylene, propylene, isobutylene and the like; vinyl alkyl ethers such as vinyl isobutyl ether, vinyl lauryl ether and vinyl cetyl ether; acrylic acid and methacrylic acid; acrylonitrile and methacrylonitrile; diethyl fumarate; maleic anhydride; dimethyl itaconate; styrene; N-vinyl carbazole; N-vinyl pyrrolidone; allyl compounds such as allyl chloride; diolefins such as butadiene, isoprene, chloroprene and the like; or mixtures thereof. Further, the vinyl chloride resins used in the practice of this invention include halogenated polyvinyl chloride and the like. If desired, use may be made of rubber-modified vinyl chloride graft copolymers in which the vinyl chloride monomer or a mixture of vinyl chloride monomer and one or more monomers copolymerizable therewith is polymerized in the presence of a rubbery elastomer having a glass transition temperature below 0° C., such rubber substrate being of the type referred to hereinafter.

Methods for the preparation of vinyl chloride polymers are well known in the art and reported in the literature. See for example Kirk-Othmer, *Encyclopedia of Chemical Technology*, Second Edition, Interscience Publishers, Volume 21, pages 369-412 (Copyright 1970), the disclosure of which is incorporated herein by reference. Vinyl chloride polymers suitable for use in forming the polyblends of this invention are available from a number of commercial sources.

In accordance with a preferred embodiment, polyblends of this invention especially adapted for use in injection molding applications are formed from polyvinyl chloride having a relative viscosity (as measured at a concentration of one gram per 100 grams of cyclohexanone at 25° C.) falling within the range of about 1.50 to about 1.85, and most preferably within the range of about 1.50 to about 1.65.

The component (B) thermoplastic copolymers are formed by the interpolymerization of at least two comonomers, namely one or more vinyl aromatic monomers and acrylic acid or methacrylic acid, or both. If desired, alpha-haloacrylic acid such as alpha-chloroacrylic acid or alpha-fluoroacrylic acid may be used in place of or together with the acrylic acid or methacrylic acid in the copolymers. Optionally, one or more copolymerizable termonomers may be incorporated in the polymer. Preferably however the component (B) copolymer consists essentially of a vinyl aromatic monomer and acrylic acid or methacrylic acid, or both, copolymers of vinyl aromatic monomer and acrylic acid monomer being particularly preferred.

The preferred vinyl aromatic monomer is styrene. However, substituted styrenes may be used either in place of or together with styrene in forming the component (B) copolymer. A few illustrative substituted styrenes include alkyl substituted styrenes such as o-methylstyrene, m-methylstyrene, p-methylstyrene, p-tert-butylstyrene, the various dimethylstyrenes, alpha-methylstyrene and the like. Halogen substituted styrenes such as chlorostyrenes, dichlorostyrenes, bromostyrenes and dibromostyrenes may also be used. Likewise use may be made of fused ring vinyl aromatic monomers, such as 1-vinylnaphthalene, 2-vinylnaphthalene, and their alkyl and/or halogen substituted counterparts, these monomers usually being employed in combination with a monocyclic styrenic monomer such as styrene or p-methylstyrene.

Among the optional copolymerizable termonomers which may be used in making the component (B) copolymers are olefins, aliphatic or aromatic esters of unsaturated esters, unsaturated ethers, unsaturated nitriles, vinyl halides, vinyl esters, and like substances. A preferred group of copolymerizable monomers includes $C_4$-$C_6$ alpha-olefins, $C_1$-$C_3$ alkyl esters of acrylic or methacrylic acid, acrylonitrile, and methacrylonitrile.

The component (B) copolymers may be rubber free, such materials sometimes being referred to as 'crystal' copolymers. Preferably, however, the component (B) copolymer is a rubber-modified graft copolymer. As is well known in the art, these materials are prepared by copolymerizing the monomers in the presence of a rubber substrate in such a way that a uniform copolymer of the polymerizing monomers is grafted onto the rubber substrate and a matrix copolymer of essentially the same composition as the graft copolymer is simultaneously generated. A typical procedure of this type involves forming a solution of a substrate rubber, the vinyl aromatic monomer(s), the acrylic or methacrylic acid(s), the termonomer(s) if used, and a chain transfer agent in a suitable solvent. Polymerization is initiated catalytically or thermally and is conducted at a temperature between about 80° C. and 250° C. During the polymerization a solution of the acrylic or methacrylic acid(s) and optionally the termonomer(s) if used, is added continuously or at frequent intervals. A total polymerization period of about six to eight hours is satisfactory in most instances.

In accordance with conventional practice, the rubber substrate will have a glass transition temperature below 0° C. Exemplary rubbers for use in preparing these copolymers include polybutadiene, polyisoprene, butadiene-styrene copolymers, butadiene-acrylonitrile copolymers, polychloroprene, ethylene-propylene copolymers, ethylene-propylene-diene-monomer terpolymers (EPDM), polypentenamers, ethylene-vinyl acetate copolymers and ethylene-alkyl acrylate copolymers. Use of polybutadiene or butadiene-styrene copolymer rubber is generally preferred. Graft copolymers in which the rubber substrate is polybutadiene containing at least 35% by weight, and even more desirably at least 90% by weight, of cis-1,4-polybutadiene are particularly preferred.

To initiate the polymerization use may be made of any of a variety of free radical generating catalysts including peroxide and azo catalysts. Exemplary of the former are di-tert-butyl peroxide, dicumyl peroxide, tert-butyl hydroperoxide, cumene hydroperoxide, p-isopropylcumene hydroperoxide, p-menthane hydroperoxide, cyclopentane hydroperoxide, pinane hydroperoxide, benzoyl peroxide, lauroyl peroxide, tert-butyl peracetate, tert-butyl perbenzoate, tert-butyl per-neodecanoate, oleyl peroxide, and tert-butyl peroctoate. Azo-bis-isobutyronitrile and the like exemplify the azo catalysts which may be employed. These catalysts may be used alone or in combinations. Molecular weight regulators (chain transfer agents) which may be used include mercaptans, aliphatic halides, terpenes, and the like. During or after the polymerization small amounts of antioxidants or stabilizers such as alkylated phenols and organic phosphites may be added to the polymerization mixture.

Solvents normally used in the process include aromatic hydrocarbons such as toluene, xylene and ethylbenzene, and ketones such as methyl ethyl ketone, dibutyl ketone, and ethyl hexyl ketone, and similar substances. Solvents will usually be employed in the range of from about 5 to 150 parts per 100 parts by weight of the monomers used. Separation of the polymer from the solvent can be achieved in various ways such as by precipitation with a nonsolvent or by removal of the volatile materials by heating the reaction product under reduced pressure.

Additional information concerning the synthesis of vinyl aromatic/acrylic acid and/or methacrylic acid copolymers, both rubber-free and rubber-modified, is reported in the literature. See for example U.S. Pat. Nos. 2,927,095; 3,035,033; 3,839,308; 4,195,169 and 4,275,182, the disclosures of which are incorporated herein by reference.

The proportions of the polymerized comonomers in component (B) may be widely varied so long as the resultant polyblend has reasonable compatability. The preferred component (B) copolymers are those containing by weight from about 95 to about 70% of one or more vinyl aromatic monomers and from about 5 to about 30% of acrylic acid, methacrylic acid, or a mixture of the two. In the case of the terpolymers the content of the acrylic acid and/or methacrylic acid will range from about 5 to about 30% by weight, and the content of the termonomer(s) will range from about 1 to about 30% by weight, with the balance being one or more copolymerized vinyl aromatic monomers. The amount of rubber in the preferred component (B) graft copolymers may be varied within considerable limits and may range from trace amounts up to as much as about 30% by weight based on the weight of the copolymerized monomers. Preferably however, component (B) contains up to about 25% by weight of the substrate rubber(s). Thus pursuant to a preferred embodiment of this invention there is provided a thermoplastic polyblend composition comprising:
(A) a thermoplastic vinyl chloride polymer, and
(B) a rubber-modified thermoplastic copolymer of
(1) at least one vinyl aromatic monomer,
(2) acrylic acid or methacrylic acid, or both, and
(3) optionally, at least one additional copolymerizable termonomer,
said copolymer grafted onto a substrate rubber.

Most preferably the copolymer of (B) contains up to about 25% by weight of the substrate rubber, and the relative proportions of components (A) and (B) in said blend are 90 to 30% by weight of (A) and 10 to 70% by weight of (B) exclusive of the substrate rubber phase.

In a preferred embodiment an impact modifier is included as a component of the polyblends. Among the suitable impact modifiers are ABS, MBS and MABS impact modifiers (i.e., a graft copolymer of (i) acrylonitrile or methyl methacrylate, or both, and (ii) a vinyl aromatic monomer, said copolymer grafted onto a substrate rubber), ethylene/vinyl acetate copolymers, chlorinated polyethylene, vinyl chloride grafted on ethylene-ethyl acrylate copolymer, vinyl chloride grafted on butyl rubber, vinyl chloride grafted on EPDM, ethylene/acrylic acid copolymers (having some of the acid functions neutralized), ethylene/methacrylic acid copolymers (having some of the methacrylic acid functions neutralized), ethylene/alkyl acrylate/methacrylic acid terpolymer (also having some of the methacrylic acid functions neutralized), oxidized polyethylene, styrene-butadiene-styrene (S-B-S) block copolymers, styrene/butadiene multiblock copolymers, styrene/butadiene radial block copolymers, hydrogenated S-B-S block copolymers, styrene-butadiene rubber, acrylic rubbers, ethylene/methyl acrylate copolymers, ethylene/ethyl acrylate copolymers, EPDM, graft copolymers of methyl methacrylate or methyl methacrylate and styrene on poly(alkylacrylates), graft copolymers of styrene and acrylonitrile on poly(alkylacrylates), and the like. Amounts of such impact modifiers generally fall within the range of from about 5 to about 40% by weight of the polyblend.

While various impact modifiers are suitable for use in the blends of this invention the preferred types are the ABS, MBS, and MABS types referred to above. Ordinarily the ABS products contain from 20 to 40% by weight of the acrylonitrile and 80 to 60% by weight of vinyl aromatic monomer in the form of copolymer grafted onto from 20 to 60% (based on the weight of the combined monomers) of a substrate rubber. The MBS products usually contain from 40 to 85% by weight of methyl methacrylate and from 60 to 15% by weight of vinyl aromatic monomer in the form of copolymer grafted onto from 20 to 60% (based on the weight of the combined monomers) of a substrate rubber. The makeup of the MABS products resembles that of MBS except that a minor proportion of the methyl methacrylate is replaced by acrylonitrile. These various materials are available as articles of commerce from a number of different suppliers.

Other ingredients, such as stabilizers, antioxidants, extenders, processing aids, pigments, and the like can be incorporated in the polyblends of this invention. Likewise reinforcing fillers in amounts sufficient to impart reinforcement or improved impact resistance can be used, examples including such materials as carbon filaments; metals; ceramics; silicates, e.g., acicular calcium silicate; asbestos; titanium dioxide; potassium titanate; titanate whiskers; glass flakes; and glass fibers. Preferred reinforcing fillers are glass fibers and particulate mineral fillers, such as mica and the like. In general, the amount of such materials will usually not exceed about 15 parts per hundred parts by weight of the combined resin in the polyblend (i.e., the upper limit is usually about 15 phr).

For improving the thermal stability and resistance to oxidative degradation, the customary amounts of stabilizers, preferably up to about 10 phr, can be incorporated in the polyblends. Examples of suitable stabilizers are phenols and phenol derivatives, preferably sterically hindered phenols which contain alkyl substituents with up to 6 carbon atoms in the position(s) ortho to the phenolic hydroxyl group(s); organic phosphites; lead stabilizers; and tin stabilizers. A few specific illustrations include 4,4'-bis(2,6-di-tert-butylphenol); 1,3,5-trimethyl-2,4,6-tris(3,5-di-tert-butyl-4-hydroxybenzyl)-benzene; 4,4'-butylidene-bis(6-tert-butyl-m-cresol); triphenyl phosphite; tricresyl phosphite; ethylene phenyl phosphite; tri(mixed mono- and dinonylphenyl) phosphite; diphenyl pentaerythritol diphosphite; phenyl didecyl phosphite; the laurates and stearates of barium and cadmium; the laurates and stearates of lead (e.g., monobasic and dibasic lead stearates); basic lead carbonate; basic lead sulfates; dibasic lead phosphite; dibasic lead phthalate; basic lead silicate; white lead; lead chlorosilicate; dialkyltin mercaptides; dialkyltin dilaurates; dibutyltin dimaleate; dibutyltin lauryl mercaptide; dioctyltin-S,S'-bis(isooctylmercaptoacetate); dibutyltin bis(isooctylthioglycolate); dioctyltin maleate polymer; dibutyltin mercaptopropionate; and the like. Use of tin stabilizers in proportions falling the range of about 1 to about 4 phr or lead stabilizers in proportions falling in the range of about 4 to 10 phr is preferred.

Processing aids of various types are entirely suitable for use in the blends of this invention. For example, use may be made of such polyvinyl chloride processing aids as those made from copolymers of methyl methacrylate and styrene, terpolymers of methyl methacrylate, lower alkyl acrylate and acrylonitrile, or terpolymers of methyl methacrylate, lower alkyl acrylate and dialkyl itaconate, and the like. The preferred processing aids are methyl methacrylate-lower alkyl acrylate copolymers having a small portion (e.g., 3 to 15%) of the lower alkyl acrylate comonomer and having an inherent viscosity as measured at a concentration of 0.25 gram per 100 milliliters of chloroform at 25° C. of at least 0.1 and preferably 0.5 or higher. A variety of such processing aids, including the preferred types, are available from various commercial sources. The amount of processing aid will generally range from about 0.5 to about 10 phr.

Typical lubricants which may be used in the blends of this invention include metal soaps, stearic acid, glyceryl monostearate, ethyl diaminostearate, paraffin and low molecular weight waxes, and the like. Conventional pigments used in polyvinyl chloride may likewise be used in the blends of this invention in conventional amounts. Ordinarily the concentration of lubricant and pigment will not exceed about 15 phr.

Flame retarding additives which may be used in the blends of the invention comprise a large number of chemical compounds which are well known to those skilled in the art. In general, they contain chemical elements which are used because of their flame-retarding capacity, for example bromine, chlorine, antimony, phosphorus and nitrogen. Preferably, the flame-retarding additives are inorganic compounds which are normally effective in combination with halogenated organic compounds. These are materials such as alumina trihydrate, antimony compounds (e.g., antimony trioxide), zinc compounds (e.g., zinc borate), antimony-zinc complex compounds (e.g., Oncor 75RA, a product of Anzon America, Inc.), iron compounds (e.g., ferric oxide), barium compounds (e.g., modified barium metaborate), molybdenum compounds (e.g., Kemgard 425, a product of Sherwin Williams Chemicals), and other metal based inorganic compounds which perform similar to antimony oxide (e.g., Ongard 2, a product of Anzon America Inc.). When using a flame retardant, the amount should be sufficient to yield a blend having a UL 94 rating of V-1 or better using test bars 0.060 inch thick.

Smoke suppressing additives may also be used. Examples include alumina trihydrate, cuprous oxide, cuprous chloride, cuprous cyanide, molybdenum trioxide, vanadium pentoxide, bis(cyclopentadienyl) iron, and combinations of nickel carbonate and zinc oxide.

The compositions of the invention may be prepared by blending the components in a mixer (e.g., a Henschel mixer) and compounding the mixture on an extruder (e.g., a Buss Ko-Kneader, a Farrel Continuous Mixer or a Werner-Pfleiderer compounding extruder.) Thereafter, the extrudate is chopped into pellets and molded on an injection molding machine.

The present invention is further illustrated by the following examples, which are not to be construed as implying any limitation on the scope of the invention.

EXAMPLE I

Two blends of this invention were prepared using the following formulation:

| Ingredient | Parts by Weight |
| --- | --- |
| Polyvinyl Chloride | 50 |
| Styrene-Acrylic Acid Copolymer | 50 |
| Lead Stabilizer | 7.5 |
| Calcium Stearate | 2 |
| Mineral Oil | 2 |
| Acrylic Processing Aid (K-125) | 2 |
| Fatty Acid Ester Lubricant | 0.5 |
| MBS Impact Modifier (KM-653) | 12 |
| Surface-Treated $CaCO_3$ | 3 |
| Tris(nonylphenyl) Phosphite | 0.12 |

| Ingredient | Parts by Weight |
|---|---|
| Phenolic Antioxidant | 0.2 |

The polyvinyl chloride was a commercial grade having a relative viscosity (measured as described above) of 1.60. The lead stabilizer was a mixture of about 87% lead monoxide and about 13% normal lead stearate. The phenolic antioxidant was 1,3,5-trimethyl-2,4,6-tris(3,5-di-tert-butyl-4-hydroxybenzyl)benzene. In one blend (Blend A), the styrene-acrylic acid copolymer was a rubber-free copolymer, identified as XP 71001.01, obtained from Dow Chemical Company, and was an experimental polymer with an acrylic acid content of approximately 8%. In the other (Blend B), it was a rubber-modified styrene-acrylic acid copolymer containing by weight approximately 84.6% of styrene, approximately 15.4% of acrylic acid, and approximately 17.1% (based on the total weight of the styrene and acrylic acid monomers) of a high cis-1,4-polybutadiene rubber. In other words, the styrene-acrylic acid copolymer contained 17.1 phr of the rubber. Synthesis of this copolymer is described in Example II hereinafter.

The foregoing blends were fused in a Brabender at 190° C. and 50 rpm for four minutes and the resultant blends were compression-molded at 400° F. (ca. 205° C.) and 40,000 psi for two minutes. Another sample of Blend A was fused in a Banbury mixer, the resultant compound rolled on a two-roll mill, and the banded material was fed through a dicer. The pellets so formed were then injection molded at medium injection speed on a New Britain injection molding machine (barrel temperature profile: 310° F. at rear zone, 320° F. at middle zone, 330° F. at front zone). The nozzle temperature was 330° F. Table I shows the Izod impact strength (measured on ¼" test specimens by ASTM procedure D 256-78) and the heat deflection temperatures (measured by ASTM procedure D 648-72) of these blends. Also shown are the corresponding values for a commercial polyvinyl chloride compound manufactured and sold by Ethyl Corporation.

TABLE I

Properties of Blends of Polyvinyl Chloride and Styrene-Acrylic Acid Copolymers

| | Commercial PVC Compound | Blend A* | Blend A+ | Blend B |
|---|---|---|---|---|
| Izod Impact, ft-lb/in | 7.7 | 0.5 | 0.4 | 0.5 |
| HDT at 264 psi, °C. | 65 | 75 | 67.5 | 71.5 |
| HDT at 66 psi, °C. | 72 | 87.7 | 80 | 77 |

*Injection-molded specimens
+Compression-molded specimens

EXAMPLE II

Blend B Copolymer—Into a polymerization reactor equipped with an agitator and a reflux condenser were charged 616 ml of styrene, 3.0 grams of terpinolene and 200 ml of ethylbenzene. Then 80 grams of high cis-polybutadiene from Goodyear Tire & Rubber Company (Budene 1208) was dissolved in the mixture. After the rubber had dissolved, a solution of 40 grams of acrylic acid in 60 ml of methyl ethyl ketone was introduced into the mixture. The temperature of the reaction mixture was raised to 95° C. and maintained between 95° and 120° C. during the course of the polymerization. Polymerization was initiated by introducing into the system a mixture of 0.2 ml of tert-butyl peracetate and 0.2 ml of tert-butyl per-neo-decanoate. About one hour later, continuous addition of a solution of 40 grams of acrylic acid and 60 ml of methyl ethyl ketone was initiated and this addition was continued for about 4.5 hours. Additional 0.2 ml portions of tert-butyl peracetate were introduced into the polymerization mixture at 110 minutes and 310 minutes after the initiation of polymerization. Polymerization was terminated 5.5 hours after initiation and the resultant polymer was recovered and dried, first in air and then in a vacuum oven, to yield 432 grams of rubber-modified styrene-acrylic acid graft copolymer. In order to produce enough copolymer for the ensuing test work this general procedure was repeated five more times and the products from the six runs were combined and mixed in a Waring blender. Variations in the polymerization conditions occurred from run to run but were not of material significance. The resultant combined polymer contained about 84.6% styrene and about 15.4% acrylic acid. Its rubber content was approximately 17.1% based on the weight of the resin phase.

EXAMPLE III

Three blends of this invention were prepared using the following formulation:

| Ingredient | Parts by Weight |
|---|---|
| Polyvinyl Chloride | 50 |
| Styrene-Acrylic Acid Copolymer | 50 |
| Dibutyltin Bis(isooctylthioglycolate) | 2 |
| Calcium Stearate | 2 |
| Mineral Oil | 2 |
| Acrylic Processing Aid (K-125) | 2 |
| Fatty Acid Ester Lubricant | 0.5 |
| MBS Impact Modifier (KM-653) | 12 |
| Surface-Treated CaCO3 | 3 |

These blends were formed using the same polyvinyl chloride as in Example I. Blend C was formed from a rubber-modified styrene-acrylic acid copolymer containing about 85.6% by weight of styrene, about 14.4% by weight of acrylic acid, and about 15.1 phr of a 1,4-polybutadiene rubber having a medium content of cis-isomer. Blend D was formed from the same rubber and contained about 84.2% by weight of styrene, about 15.8% by weight of acrylic acid, and about 17.3 phr of the same rubber. Blend E was formed from a rubber-modified styrene-acrylic acid copolymer in which the rubber was a multi-block styrene-butadiene copolymer containing 10% styrene. This rubber-modified styrene-acrylic acid copolymer contained on a weight basis about 85.7% of styrene, about 14.3% of acrylic acid and about 16.6 phr of this multiblock copolymer rubber. The synthesis of these rubber-modified styrene-acrylic acid copolymers is described in Example IV hereinafter.

The above blends were fused and compression molded as in Example I. The Izod impact strength and heat deflection temperatures of the molded specimens were measured as in Example I and are summarized in Table II.

TABLE II

Properties of Blends of Polyvinyl Chloride and Styrene-Acrylic Acid Copolymers

| | Blend C | Blend D | Blend E |
|---|---|---|---|
| Izod Impact, ft-lb/in | 0.5 | 0.9 | 0.6 |
| HDT at 264 psi, °C. | 66 | 65 | 60 |

TABLE II-continued

| Properties of Blends of Polyvinyl Chloride and Styrene-Acrylic Acid Copolymers | | | |
|---|---|---|---|
| | Blend C | Blend D | Blend E |
| HDT at 66 psi, °C. | 77 | 73 | 70 |

On the basis of subsequent experimental work, it is believed that the relatively low heat deflection temperatures of Blends C, D and E was due to the presence in the copolymers of excessive amounts of residual volatile materials.

EXAMPLE IV

Blend C Copolymer—Into a polymerization reactor equipped with an agitator and a reflux condenser were charged 770 ml of styrene, 4 grams of terpinolene, 200 ml of ethylbenzene and 200 ml of methyl ethyl ketone. Then 100 grams of medium cis-polybutadiene from Firestone Tire & Rubber Company (Diene 35) was dissolved in the mixture. After the rubber had dissolved, 50 ml of acrylic acid was added to the mixture. The temperature of the reaction mixture was raised to 80° C. and maintained between 80° and 120° C. during the course of the polymerization. Polymerization was initiated by introducing into the system a mixture of 0.3 ml of tert-butyl peracetate and 0.3 ml of tert-butyl per-neo-decanoate. About 1.5 hours later, continuous addition of 50 ml of acrylic acid was initiated and this addition was continued for about 5 hours. Additional 0.3 ml portions of tert-butyl peracetate were introduced into the polymerization mixture at 135 minutes and 270 minutes after the initiation of polymerization. To control the viscosity of the reaction mixture, 350 ml of methyl ethyl ketone was added from 315 minutes to 390 minutes after initiation of polymerization. Polymerization was terminated about 6.75 hours after initation and a solution of two grams of 1,3,5-trimethyl-2,4,6-tris(3,5-di-tert-butyl-4-hydroxybenzyl)-benzene and 0.5 gram of tris(nonylphenyl) phosphite dissolved in 100 ml of methyl ethyl ketone was added. The resultant polymer was recovered and dried, first in air and then in a vacuum oven, to yield 660 grams of rubber-modified styrene-acrylic acid graft copolymer. The resultant polymer contained about 85.6% styrene and about 14.4% acrylic acid. Its rubber content was approximately 15.1% based on the weight of the resin phase.

Blend D Copolymer—The procedure used to prepare this copolymer was substantially the same as that used in making the Blend C copolymer except for minor procedural differences and in differences in quantities of materials used. In this instance, three polymerization runs were conducted and the products from these runs were combined in a Waring blender. The resultant combined product contained about 84.2% styrene, about 15.8% acrylic acid and about 17.3% of the rubber based on the weight of the resin phase.

Blend E Copolymer—This copolymer was prepared in substantially the same manner as that used in preparation of the Blend C copolymer except that the rubber was a styrene-butadiene multiblock copolymer containing 90% polybutadiene and 10% styrene of which 7% was indicated to be block styrene, and the remaining 3% being randomly bound (Stereon 720, a product of The Firestone Tire & Rubber Company). This copolymer contained by weight about 85.7% styrene and about 14.3% acrylic acid. Its rubber content was about 16.6% based on the weight of the resin phase.

EXAMPLE V

Seven blends of this invention were prepared using the polyvinyl chloride and polyvinyl chloride formulation as in Example III. The styrene-acrylic acid copolymers used in the respective blends had the following compositions on a weight basis:

| Blend | Acrylic Acid, % | Styrene, % | Rubber, phr |
|---|---|---|---|
| F | 8.4 | 91.6 | None |
| G | 7.8 | 92.2 | 9.0 |
| H | 13.8 | 86.2 | 10.5 |
| I | 15.4 | 84.6 | 17.1 |
| J | 17.1 | 82.9 | None |
| K | 17.1 | 82.9 | 14.5 |
| L | 20.1 | 79.9 | 8.8 |

The styrene-acrylic acid copolymer used in Blend F was XP 71001.01 from Dow Chemical Company (see Example I). The synthesis of the other styrene-acrylic acid copolymers tabulated above is described in Example VI hereinafter. It is to be noted that the rubber-modified graft copolymers used in these blends were made from a high cis-1,4-polybutadiene rubber (minimum of 95% cis-isomer) obtained from The Goodyear Tire & Rubber Company and identified as Budene-1208.

Using the blending, compression-molding and test procedures described in Example I, the results set forth in Table III were obtained.

TABLE III

| Properties of Blends of Polyvinyl Chloride and Styrene Acrylic Acid Copolymers | | | | | | | |
|---|---|---|---|---|---|---|---|
| | Blend | | | | | | |
| | F | G | H | I | J | K | L |
| Izod Impact, ft-lb/in | 0.3 | 0.5 | 0.4 | 0.7 | 0.2 | 0.5 | 0.5 |
| HDT at 264 psi, °C. | 70.9 | 65 | 64 | 67 | 67 | 68 | 70 |
| HDT at 66 psi, °C. | 80 | 69 | 74 | 77 | 83 | 82.5 | 87 |

EXAMPLE VI

Blend G Copolymer—The initial charge to the polymerization vessel was composed of 770 ml of styrene, 200 ml of ethylbenzene and 4.0 g of terpinolene. Then 45 g of high cis-1,4-polybutadiene (95% minimum) from The Goodyear Tire & Rubber Company (Budene 1208) was dissolved in the mixture. Thereupon, a solution of 22 ml of acrylic acid in 60 ml of methyl ethyl ketone was added to the mixture. The temperature of the system was raised to 90° C. and maintained between 90° and 118° C. during the course of the polymerization. Initiation of polymerization was caused by use of 1.5 ml tert-butyl peracetate and 1.5 ml of tert-butyl per-neo-decanoate. A continuous addition of a solution of 44 ml of acrylic acid in 356 ml of methyl ethyl ketone was initiated 10 minutes before charging the catalyst and was continued for a period of 350 minutes. At 110 minutes and again at 232 minutes after the initiation of polymerization, additional 1.5 ml portions of tert-butyl per-neo-decanoate were added to the polymerization mixture. Polymerization was terminated about 6.5 hours after initiation and a solution of 2 g of 1,3,5-trimethyl-2,4,6-tris-(3,5-di-tert-butyl-4-hydroxybenzyl)-benzene and 1.3 g of tris(nonylphenyl) phosphite dissolved in 50 ml of methyl ethyl ketone was added. The resultant polymer was recovered and dried, first in air and then in a vacuum oven at a temperature of 120° C. for about 16 hours.

Blend H Copolymer—This copolymer was produced using substantially the same procedure as described above for the copolymer of Blend G, except of course that a high proportion of acrylic acid to styrene was used. In particular, the initial charge of acrylic acid was 40 ml and an additional 60 ml was introduced during the course of polymerization. The total quantity of styrene used was 770 ml.

Blend I Copolymer—This copolymer was a portion of the same copolymer as used in Blend B—see Example II above for the synthesis procedure.

Blend J Copolymer—The initial charge to the polymerization reactor consisted of 308 ml of styrene, 38 ml of acrylic acid, 80 ml of methyl ethyl ketone, 93 ml of toluene and 1.5 g of terpinolene. The temperature of the mixture was raised to 86° C. and polymerization was initiated by the introduction of 0.1 ml of tert-butyl per-neo-decanoate and 0.1 ml of tert-butyl peracetate. Ten minutes before the initiation of polymerization, a continuous addition of a solution of 40 g of acrylic acid in 58 ml of methyl ethyl ketone was started and continued for about 4.75 hours. Over this period, the temperature of the system was maintained between about 86° and 110° C. An additional 0.1 ml portion of tert-butyl peracetate was added to the polymerization mixture at about 2.5 hours after polymerization was initiated. The polymerization was terminated at about 7.5 hours after initiation. The polymer was recovered by precipitation using methanol, and then granulated in water using a Waring blender. The granulated product was then dried in air and then in a vacuum oven at 120° C. for about 16 hours.

Blend K Copolymer—The initial charge into the polymerization reactor was composed of 770 ml styrene, 310 toluene, 45 ml acrylic acid, 4.0 g terpinolene, 1.0 g tris(nonylphenyl) phosphite and 50 g of Budene 1208. The temperature was raised to 92° C. and maintained from 92° to 101° C. during the course of polymerization. Polymerization was initiated by addition of 1.5 ml tert-butyl per-neo-decanoate and 1.5 ml of tert-butyl peracetate. At about 2 hours and again at about 4.5 hours after the initiation of polymerization, additional 1.5 ml quantities of tert-butyl peracetate were added to the polymerization mixture. Polymerization was terminated about 6 hours after initiation and thereupon, a solution of 2 g of 1,3,5-tri-methyl-2,4,6-tris(3,5-di-tert-butyl-4-hydroxybenzyl)-benzene in 30 ml of toluene was added to the mixture. The resultant polymer was recovered and dried, initially in air and thereafter in a vacuum oven at 120° C. for about 6 hours. A yield of 346 g of copolymer was obtained.

Blend L Copolymer—The initial charge into the polymerization reactor was composed of 770 ml styrene, 300 ml toluene, 45 g Budene 1208, 4.0 g terpinolene, and 59 ml acrylic acid. The temperature was raised to 86° C. Polymerization was initiated by the addition of 1.5 ml tert-butyl per-neo-decanoate and 1.5 ml tert-butyl peracetate. Thereupon a solution of 63 ml of acrylic acid and 300 ml heptane was continuously added during a period of 370 minutes. The temperature was maintained from 86° to 115° C. during the polymerization. Additions of 1.5 ml quantities of tert-butyl per-neo-decanoate were made at 117 minutes and 247 minutes after the initiation of polymerization. Polymerization was terminated after about 6 hours and a solution of 2.0 g of 1,3,5-tri-methyl-2,4,6-tris(3,5-di-tert-butyl-4-hydroxybenzyl)-benzene in 80 ml of methyl ethyl ketone was added. The recovered polymer was air dried and then dried in a vacuum oven for about 16 hours at about 120° C.

As noted above, experimental work has indicated that the extent to which the copolymer has been dried and therefore freed of residual volatile materials has a considerable influence upon its effectiveness in increasing the heat deflection temperature of the polyvinyl chloride blend in which it is used. This was demonstrated by Example VII presented hereinafter wherein portions of the copolymers used in making up Blends G and L were subjected to additional, more rigorous drying in order to remove the residual volatiles and Blends G and L were reformulated using the resultant, more highly dried copolymers.

EXAMPLE VII

A portion of the copolymer prepared for use in Blend G was further dried in a vacuum oven to a constant weight. The conditions of drying involved a programmed temperature increase ranging from 80° to 150° C. over a four-day period. The same drying procedure was also applied to a portion of the copolymer prepared for use in Blend L.

The resultant more thoroughly dried copolymers were then compounded in the same manner and using the same formulation as the initial Blends G and L. Test specimens made from the reformulated Blends G and L were then subjected to the same test procedures as the initial Blends G and L and the results are shown in Table IV.

TABLE IV

| Properties of Blends of Polyvinyl Chloride and Styrene-Acrylic Acid Copolymers | | |
|---|---|---|
| | Reformulated Blend G | Reformulated Blend L |
| Izod Impact, ft-lb/in | 0.5 | 0.6 |
| HDT at 264 psi, °C. | 57.5 | 69.0 |
| HDT at 66 psi, °C. | 80.0 | 99.0 |

It will be noted that the heat deflection temperature at 66 psi was significantly increased as compared to the corresponding blends made from the less highly dried copolymers.

EXAMPLE VIII

Two blends of this invention were prepared using rubber-modified styrene-methacrylic acid copolymers, the synthesis of which is described in Example IX hereinafter. In Blend M, the copolymer was composed by weight of about 74.7% of styrene, about 25.3% of methacrylic acid and 18.3 phr of the high cis-1,4-polybutadiene rubber referred to in Example V. The copolymer of Blend N, made from the same rubber, contained about 81.5% styrene, about 18.5% of methacrylic acid and about 18.6 phr of the rubber. These blends were made from the same polyvinyl chloride and polyvinyl chloride formulation as in Example III.

The blends were prepared, fused, compression molded and tested as in Example I. The results are set forth in Table V.

TABLE V

| Properties of Blends of Polyvinyl Chloride and Styrene-Methacrylic Acid Copolymers | | |
|---|---|---|
| | Blend M | Blend N |
| Izod Impact, ft-lb/in | 1.9 | 0.7 |
| HDT at 264 psi, °C. | 65 | 71 |

TABLE V-continued

| Properties of Blends of Polyvinyl Chloride and Styrene-Methacrylic Acid Copolymers | | |
|---|---|---|
| | Blend M | Blend N |
| HDT at 66 psi, °C. | 73 | 76.5 |

The poor physical properties exhibited by Blend M are believed to be due to the presence of an excessive amount of residual volatile materials in the copolymer used in that blend.

EXAMPLE IX

Blend M Copolymer—A two-liter resin kettle equipped with an agitator was charged with 700 g styrene, 100 g high cis-1,4-polybutadiene (95% minimum) from the Goodyear Tire & Rubber Company (Budene 1208), 4 g terpinolene (a chain transfer agent), and 200 ml of ethyl benzene. After the rubber had dissolved in the styrene monomer/solvent solution the temperature was raised to 90° C. and the polymerization was initiated by the addition of 1.5 ml of tert-butyl per-neo-decanoate and 1.5 ml of tert-butyl peracetate. A solution of 190 g methacrylic acid in 80 ml of methyl ethyl ketone and 80 ml of ethylbenzene was added over a period of 5.75 hours. At 16 minutes, 144 minutes and 280 minutes from the start of polymerization 1.5 ml portions of tert-butyl per-neo-decanoate were added to the mixture. At about 1.5 hours after the start of polymerization 100 ml of methyl ethyl ketone and 100 ml of ethylbenzene were added to the mixture. The polymerization was terminated after about 6 hours from initiation and a solution of 2 g of 1,3,5-tri-methyl-2,4,6-tris(3,5-di-tert-butyl-4-hydroxybenzyl)-benzene and 0.78 g of tris(nonylphenyl) phosphite in 25 ml of methyl ethyl ketone was added. The polymer was dried in air and then in a vacuum oven at 120° C. for about 16 hours.

Blend N Copolymer—A two-liter resin kettle (equipped with an agitator) was charged with 700 g of styrene, 85 g of high cis-1,4-polybutadiene (95% minimum) from The Goodyear Tire & Rubber Company (Budene-1208), 4 g terpinolene (a chain transfer agent), 300 ml of ethylbenzene, and 1 g of tris(nonylphenyl) phosphite. After the rubber had dissolved in the styrene monomer/solvent solution, a solution of 80 g methacrylic acid in 100 ml methyl ethyl ketone was added to the above solution. The temperature of the reaction mixture was raised to 95° C. and the polymerization was initiated by the addition of 1.5 ml of tert-butyl per-neo-decanoate and 1.5 ml of tert-butyl peracetate. Then a continuous addition of methacrylic acid (27 g) was made at a rate of about 4.7 g/hr for a period of 5.75 hours. An additional 1.5 ml of tert-butyl per-neo-decanoate was added at 2 and 4.4 hours from the start of polymerization. To maintain a low polymerization viscosity, 500 ml of ethylbenzene was added 2.2 hours after initiation. Polymerization was terminated after 6.25 hours from the initiation of polymerization by the addition of two g of 1,3,5-tri-methyl-2,4,6-tris(3,5-di-tert-butyl-4-hydroxybenzyl)-benzene dissolved in 50 ml of methyl ethyl ketone. The polymer (45.8% conversion) was isolated and dried first by means of air and thereafter under vacuum at 120° C. The polymer contained 81.5% of styrene, 18.5% of methacrylic acid and 18.6 phr of the high cis-1,4-polybutadiene rubber.

This invention is susceptible to considerable variation within the spirit and scope of the appended claims.

I claim:

1. A thermoplastic polyblend composition comprising:
   (A) a thermoplastic vinyl chloride polymer, and
   (B) a rubber-modified thermoplastic compolymer of
      (1) 95 to about 70% by weight of at least one vinyl aromatic monomer, and
      (2) 5 to about 30% by weight of acrylic acid or methacrylic acid, or both, said copolymer grafted onto a substrate 1,4-polybutadiene rubber containing at least 90% by weight of cis-1,4-polybutadiene, said copolymer having been dried and substantially freed of residual volatile materials.

2. A composition of claim 1 wherein said component (A) is polyvinyl chloride.

3. A thermoplastic polyblend composition comprising:
   (A) polyvinyl chloride, and
   (B) a rubber-modified thermoplastic compolymer of
      (1) 95 to about 70% by weight of at least one vinyl aromatic monomer, and
      (2) 5 to about 30% by weight of acrylic acid or methacrylic acid, or both,
   said copolymer grafted onto a substrate 1,4-polybutadiene rubber containing at least 95% by weight of cis-1,4-polybutadiene, said copolymer having been dried and substantially freed of residual volatile materials, said copolymer containing up to about 25% by weight of substrate rubber based on the weight of the resin phase of said copolymer, the relative proportions of components (A) and (B) in said blend being 90 to 30% by weight of (A) and 10 to 70% by weight of (B) exclusive of the substrate rubber phase.

4. A composition of claim 3 wherein said thermoplastic copolymer (B) is a rubber-modified graft copolymer of a vinyl aromatic monomer and acrylic acid.

5. A composition of claim 4 wherein said vinyl aromatic monomer is predominantly styrene.

6. A composition of claim 3 further including an impact modifier in the polyblend.

7. A composition of claim 6 wherein said impact modifier is a graft copolymer of (i) acrylonitrile or methyl methacrylate, or both, and (ii) a vinyl aromatic monomer, said copolymer grafted onto a substrate rubber.

8. A composition of claim 7 wherein said impact modifier is a rubber-modified styrene/methyl methacrylate copolymer.

9. A composition of claim 3 wherein said polyvinyl chloride has a relative viscosity as measured at a concentration of 1 gram per 100 grams of cycohexanone at 25° C. falling within the range of about 1.50 to about 1.85.

10. A composition of claim 3 wherein said thermoplastic copolymer (B) is a rubber-modified graft copolymer of a vinyl aromatic monomer and methacrylic acid.

11. A composition of claim 10 wherein said vinyl aromatic monomer is predominantly styrene.

* * * * *